E. E. F. CREIGHTON.
SYSTEM OF ELECTRICAL SWITCHING.
APPLICATION FILED DEC. 31, 1917.
1,331,050.
Patented Feb. 17, 1920.
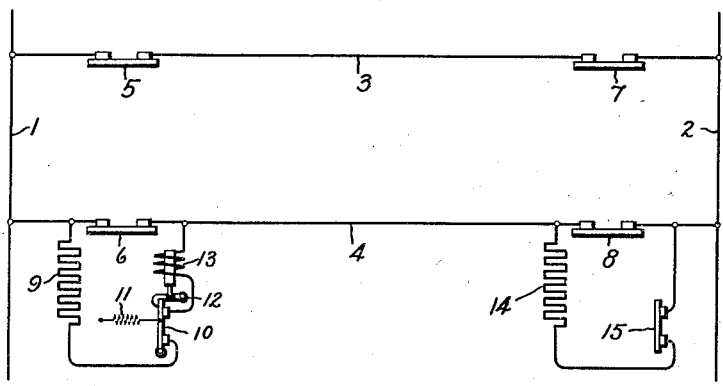
Inventor:
Elmer E. F. Creighton,
by *Albert G. Davis*
His Attorney.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

SYSTEM OF ELECTRICAL SWITCHING.

1,331,050.   Specification of Letters Patent.   Patented Feb. 17, 1920.

Application filed December 31, 1917. Serial No. 209,755.

*To all whom it may concern:*

Be it known that I, ELMER E. F. CREIGHTON, a citizen of the United States, residing at Schenectady, in the county of Schenectady, State of New York, have invented certain new and useful Improvements in Systems of Electrical Switching, of which the following is a specification.

My invention relates to systems of electric switching on high tension power lines and especially on power lines paralleling lines of communication such as telephone and telegraph lines and has for its object to provide a system for connecting and disconnecting a feeder of such a power line without producing inductive interference in the parallel telephone or telegraph lines.

In running a telephone or similar line between stations for purposes of communication, it is customary to carry this line on the same poles with the transmission or power line, hence paralleling the high tension feeders. Such communication lines between some cities and towns are also often similarly carried. Telephone or telegraph lines which parallel power lines are thereby subjected to a great deal of trouble due to electromagnetic induction from the parallel power lines and are often so badly affected as to prevent communication over the lines. Such inductive interference is due in a great part to oscillatory surges set up on the power line due to the production of heavy current arcs during switching operations.

According to my invention I provide a system of switching on power lines in which no detrimental arcs are set up and in which the power line may be connected or disconnected without thereby setting up of oscillatory surges thus eliminating inductive interference in parallel telephone lines.

The novel features which I believe to be characteristic of my invention will be definitely indicated in the claims appended hereto while the features of construction and mode of operation will be understood by reference to the following description taken in connection with the accompanying drawing which shows diagrammatically a system of distribution embodying my invention.

In the drawing, for the purposes of clearness, I have shown, diagrammatically, a system of distribution in one line diagram only, comprising bus bars 1 and 2 which may represent the station buses at two separate stations on a system. Between the station bus bars 1 and 2, I have shown connected two power lines or feeders 3 and 4, it being understood that any number of feeders may be so connected in parallel. The feeders 3 and 4 are provided with switches 5 and 6 respectively, for connecting the feeders at one end to bus 1 and switches 7 and 8 respectively connect the feeders at their other ends to bus 2 so that each feeder may be connected or disconnected from either or both lines.

For purposes of clearness, I have shown my invention applied to feeder 4 only it being understood that feeder 3 is similarly operated. Switch 6 of feeder 4 is provided with shunt circuit including a current limiting means or resistance element 9 and a circuit controlling device 10 biased to open position by a spring 11 or other suitable means, but normally held closed by a latch 12 controlled by an electroresponsive device or relay 13 having its actuating winding in series with the circuit through the switch or circuit controlling device 10. The circuit controlling device 10 is, therefore, held latched closed but is automatically opened in response to predetermined conditions through the control means 13. Switch 8 is also provided with a shunt circuit including a current limiting means or resistance element 14 and a non-automatic current controlling device 15.

The operation of my switching means may be described as follows: Assume that it is desired to disconnect feeder 4, maintaining feeder 3 operating as usual. The operation of the switches 6 and 8 and circuit opening devices 12 and 15 must take place successively and in a predetermined sequence. The first step is the opening of switch 6, by the operator at the station including bus 1. No appreciable voltage will exist across the contacts of this switch as it opens, because it is fed directly from the bus through the switch 8 and is maintained at the same potential as bus 1. At this first critical stage, therefore, arcing at the contacts of switch 6 is avoided. When the switch opens, the shunt circuit including resistance 9 is included in series with the circuit of feeder 4. When switch 6 is opened, the operator at the station including bus 2 is notified and he then opens switch 8 which connects the feeder 4 to bus 2. When switch 8 opens, its shunt circuit including resistance element 14 is included in series with the feeder 4. There is a somewhat greater tendency to produce arcing at the contacts of switch 8 as it opens, because the voltage of feeder 4 is maintained through the resistance elements 9 and 14. However, any oscillations which may take place are damped by the resistance elements by the proper choice of resistance values relative to the capacitance of feeder 4, and the arcs on opening switch 8 can thus be made inappreciable.

Feeder 4 is now connected to buses 1 and 2 by means of the shunt circuits including resistance elements 9 and 14. After the operator opens switch 8 he then successively opens circuit opening device 15 to break the shunt circuit including resistance element 14 and thereby disconnects feeder 4 from bus 2. The opening of switch 15 produces little arcing which is damped by the resistance elements. When switch 15 is opened, the operator at the station including bus 1, opens circuit opening device 10 breaking the shunt circuit including resistance element 9 and disconnecting the feeder 4 from bus 1, the resistance element being of a sufficient value to prevent undesirable currents from flowing across the contacts of the circuit opening device 10 while it is opening. It is within the scope of my invention to increase the resistance of either element 9 or 14 as a step in the final opening of the feeder. I prefer, however, to have circuit opening device 10 open automatically in response to a movement of latch 12 by the control means 13. As long as current is fed to feeder 4 from both ends or from both buses 1 and 2 the coil of the control means or relay 13 will carry less current than it will after switches 6 and 8 are opened. If the relay 13 is, therefore, set to operate upon the full charging current of feeder 4, it will move the latch 12 to unlatching position and permit the switch 10 to open in response to the spring 11. When the operator at bus 2 opens the switches 8 and 15 in succession, switch 10, thereby, automatically opens by the actuation of its latching or restraining means which gives an indication to the operator at bus 1 that the switching has been satisfactorily completed. In reconnecting the feeder 4 the sequence of operations is reversed. Switch 10 is closed first and then switches 15 and 8 in succession and finally switch 6. Switch 10 is held closed by hand until switches 15 and 8 have been closed or may be locked closed by an auxiliary latching means, not shown.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. The method of switching on power lines to prevent inductive interference in parallel lines of communication which consists in consecutively opening switches at each end of said line to include circuits of high resistance in series with said power line, and then subsequently opening said high resistance circuits in a definite sequence.

2. The method of switching on power lines to prevent inductive interference in parallel lines of communication which consists in successively opening switches at each end of said line to include circuits of high resistance in series with said power line, opening the circuit of one of said resistances to disconnect said line at one end whereupon the circuit of the other resistance is opened automatically.

3. The method of preventing inductive interference in telephone lines due to switching on parallel power lines which consists in successively opening switches at each end of the power line to connect in series with said line circuits including resistance, and then opening the circuits including resistance in the reverse order.

4. The combination with an electrical conductor, of switches at each end of said conductor, circuits in shunt to said switches, current limiting means in said shunt circuits, and circuit opening devices controlling said shunt circuits, said switches and current opening device being opened and closed in a predetermined sequence.

5. The combination with an electrical conductor, switches at each end of said conductor, circuits including current limiting means shunted by said switches when closed and included in the circuit through said conductor when the switches are opened, means for opening said shunt circuits, said switches and said means operating to connect and disconnect said conductor in a definite sequence.

6. The combination with an electrical conductor, switches at each end of said conductor, circuits including current limiting means connected in the circuit of said conductor upon the opening of said switches, and circuit controlling means for finally disconnecting said conductor through said circuits in a predetermined sequence.

7. In combination with an electrical conductor, switches at each end of said conductor, means for disconnecting said conductor without setting up surges on said conductor comprising a shunt path to each of said switches, resistance elements in said paths, a switch for opening the circuit of one of said resistance elements, and a switch for disconnecting the circuit of the other resistance element automatically in response to the opening of the circuit controlling the circuit of the first resistance.

In witness whereof, I have hereunto set my hand this 22nd day of December, 1917.

ELMER E. F. CREIGHTON.